US011299259B2

(12) United States Patent
Christensen et al.

(10) Patent No.: US 11,299,259 B2
(45) Date of Patent: Apr. 12, 2022

(54) HYBRID LOW SPEED CONTROL

(71) Applicant: Bell Textron Inc., Fort Worth, TX (US)

(72) Inventors: Kevin Thomas Christensen, Plano, TX (US); Hunter Barton Nelson, North Richland Hills, TX (US); Martin Wesley Shubert, Tall Timbers, MD (US); Paul David Ruckel, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 170 days.

(21) Appl. No.: 16/775,531

(22) Filed: Jan. 29, 2020

(65) Prior Publication Data
US 2021/0229798 A1 Jul. 29, 2021

(51) Int. Cl.
*G06F 7/00* (2006.01)
*B64C 19/02* (2006.01)
*B64C 15/12* (2006.01)

(52) U.S. Cl.
CPC .............. *B64C 19/02* (2013.01); *B64C 15/12* (2013.01)

(58) Field of Classification Search
CPC .... B62D 5/0409; B62D 5/0406; B62D 5/046; B62D 15/025; B62D 1/00; B62D 5/04; G06F 9/451; G06F 7/00; B60W 50/08; B60W 2510/20; G05D 1/021; Y02A 40/10; A01B 69/008
USPC .......................................................... 701/3
See application file for complete search history.

(56) References Cited

U.S. PATENT DOCUMENTS

| | | | |
|---|---|---|---|
| 5,213,283 A * | 5/1993 | Gold ...................... G05D 1/085 244/17.13 |
| 5,596,499 A * | 1/1997 | Glusman .............. G05D 1/0858 700/78 |
| 7,930,074 B2 | 4/2011 | Cherepinsky et al. |
| 8,332,082 B2 * | 12/2012 | Christensen ......... G05D 1/0202 701/3 |
| 9,162,752 B2 * | 10/2015 | Christensen ............ B64C 19/00 |
| 9,308,985 B2 * | 4/2016 | Kubik .................. G05D 1/0858 |
| 2002/0052675 A1 * | 5/2002 | Mezan .................. B64C 13/503 701/4 |
| 2004/0093130 A1 * | 5/2004 | Osder ..................... B64C 27/24 701/3 |
| 2008/0071431 A1 * | 3/2008 | Dockter ................. G01C 21/00 701/3 |
| 2013/0060406 A1 * | 3/2013 | Christensen ......... G05D 1/0607 701/4 |
| 2018/0208305 A1 * | 7/2018 | Lloyd ..................... B60L 50/61 |
| 2018/0329430 A1 * | 11/2018 | Bothwell ............... B64C 27/82 |
| 2019/0002116 A1 * | 1/2019 | Gansler ..................... F02K 5/00 |

OTHER PUBLICATIONS

Bender, Jeffrey, et al.; "MH-47G Digital AFCS Evolution"; presented at the American Helicopter Society 67th Annual Forum; Virginia Beach, VA; May 3-5, 2011; 25 pages.

* cited by examiner

*Primary Examiner* — Shardul D Patel
(74) *Attorney, Agent, or Firm* — Shackelford, Bowen, McKinley & Norton, LLP

(57) ABSTRACT

An exemplary method for controlling low speed flight of an aircraft having a controller receiving pilot input includes transitioning from a translational rate command (TRC) to a linear acceleration command (LAC) when the controller is displaced above a control transition displacement (CTD), and while in LAC holding speed when the controller is relaxed to CTD.

19 Claims, 3 Drawing Sheets

HYBRID LOW SPEED CONTROL

STATEMENT REGARDING FEDERALLY SPONSORED RESEARCH OR DEVELOPMENT

At least some of the subject matter disclosed in this application may have been made with government support under contract number W911W6-13-2-0001 awarded by U.S. Army Aviation Applied Technology Directorate. The government may have certain rights in the invention.

TECHNICAL FIELD

This disclosure relates in general to the field of flight controls, and more particularly, to a hybrid low speed flight control.

BACKGROUND

This section provides background information to facilitate a better understanding of the various aspects of the disclosure. It should be understood that the statements in this section of this document are to be read in this light, and not as admissions of prior art.

Brownout or whiteout is a phenomenon where flight visibility is reduced due to airborne particles from rotor downwash. During brownout, the pilot is unable to see nearby objects which are necessary to provide outside visual references in order to control the aircraft while hovering near the ground. Because of brownout, the degraded visual environment can cause the pilot to lose awareness, which can lead to an accident.

Brownout during helicopter landing and take-off operations in arid desert terrain has been responsible for more than 30 accidents in recent years. Intense, blinding dust clouds stirred up by the helicopter rotor downwash can cause significant flight safety risks from ground obstacle collisions and dynamic rollover due to uneven terrain.

Brownout and whiteout conditions can be caused by sand storms, low wind-shear interaction, and helicopter downwash with ground effect. In most cases, the brownout scenario is unavoidable. Flying into this kind of environment can be very challenging when encountering an unprepared landing site, obstacles in the landing zone or flight path, loss of the horizontal reference, instrument malfunctions, windy conditions, sensor errors, jammed actuators, or ground effect interactions.

SUMMARY

An exemplary method for controlling low speed flight of an aircraft having a controller receiving pilot input includes transitioning from a translational rate command (TRC) to a linear acceleration command (LAC) when the controller is displaced above a control transition displacement (CTD).

The aircraft may be maneuvered with the TRC when the controller is below the CTD and a groundspeed of the aircraft is less than a TRC threshold speed and the aircraft may be maneuvered with the LAC when the groundspeed is greater than the TRC threshold speed. In an exemplary embodiment, the method includes transitioning from the LAC to the TRC when the controller is below the CTD and a groundspeed of the aircraft is less than a TRC threshold speed.

An exemplary method for LAC may further include commanding acceleration when the controller is above the CTD, commanding zero acceleration when the controller is at the CTD, and commanding deceleration when the controller is below the CTD and the groundspeed is greater than the TRC threshold speed.

An exemplary system for controlling low speed flight of an aircraft includes a rotor system having blades to propel the aircraft, a controller in data communication with an aircraft computer, the controller displaced from a detent position in response to manual input from a pilot, wherein the detent position is a centered, no-force position and the aircraft computer having instructions stored thereon that cause the system to transition from TRC to LAC when the controller is displaced above a CTD.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
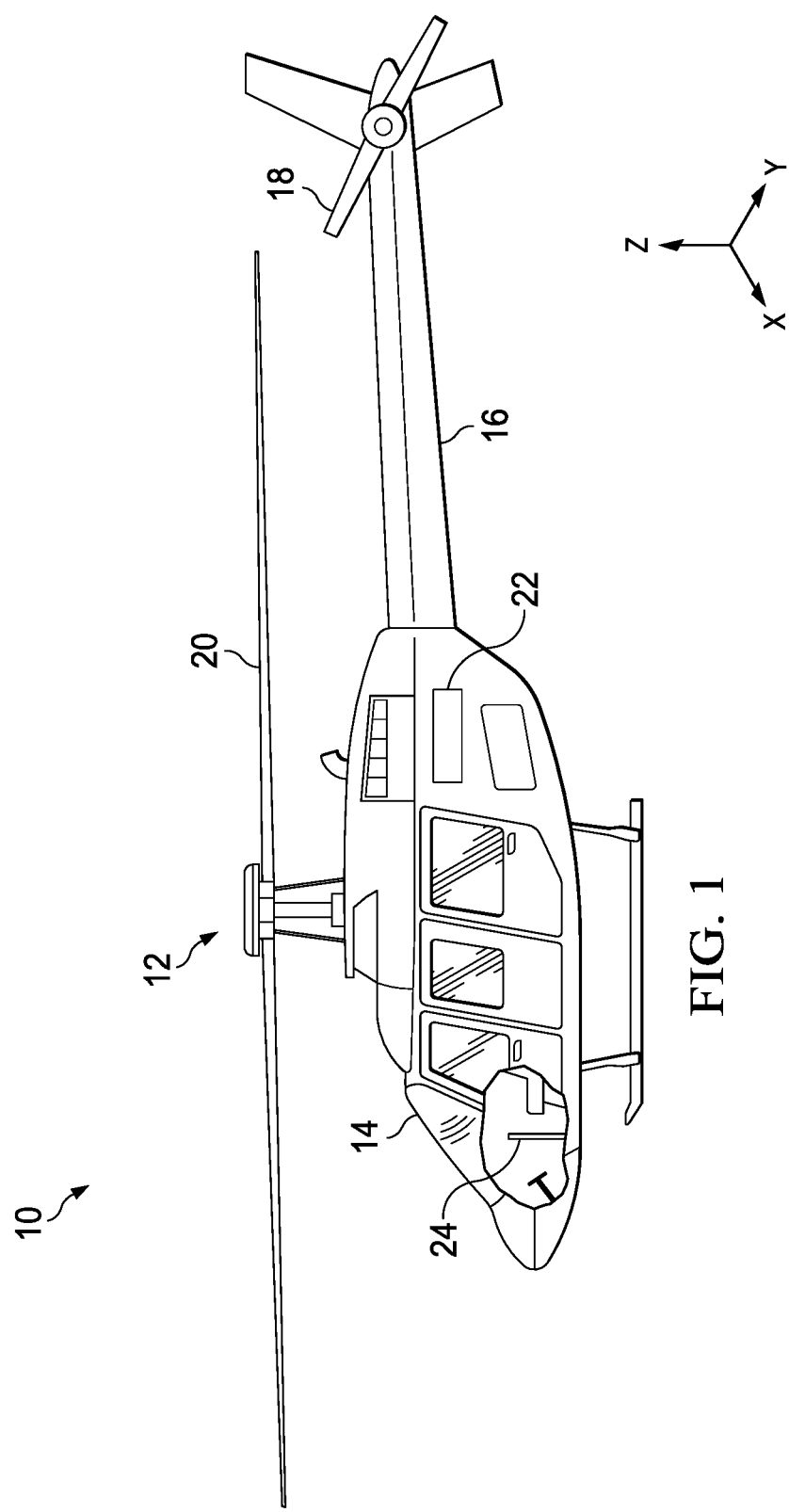
FIG. 1 illustrates an exemplary rotorcraft implementing an exemplary hybrid low speed control system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 depicts three mutually orthogonal directions X, Y, and Z forming a three-dimensional frame of reference XYZ. Longitudinal axis X corresponds to the roll axis that extends through the center of aircraft 10 in the fore and aft directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIG. 1 illustrates an exemplary vertical takeoff and landing (VTOL) rotary aircraft 10 that incorporates an augmented low speed flight control system according to an embodiment. Aircraft 10 includes a rotor system 12, a fuselage 14, and a tail boom 16 carrying an anti-torque system represented by rotor 18. Rotor system 12 includes a main rotor having multiple blades 20 for creating flight. Tail boom 16 may include one or more rotors 18. Rotor 18 generally provides thrust to counter the torque due to the rotation of rotor blades 20. Teachings of certain embodiments recognize that tail rotor 18 may represent one example of a rotor or anti-torque rotor; other examples include, but are not limited to, tail propellers, ducted tail rotors, and ducted fans mounted inside and/or outside the aircraft. Teachings of certain embodiments relating to rotors and rotor systems may apply to rotor system 12 and other rotor systems, such as distributed rotors, tiltrotor, tilt-wing, and helicopter rotor systems. It should be appreciated that teachings herein apply to manned and unmanned vehicles and aircraft including without limitation airplanes, rotorcraft, tiltrotors, hovercraft, helicopters, and rotary-wing vehicles.

Aircraft 10 includes aircraft computers 22, which may be operable to collect data about, or control flight of, aircraft 10. In some embodiments, aircraft 10 is a fly-by-wire aircraft, and in such embodiments, aircraft computers 22 may be flight control computers (FCCs) operable to execute one or more control laws (CLAWS) that control flight of aircraft 10. Aircraft computers 22 may be operable to perform sensor data collection and analysis as part of a health and usage monitoring system (HUMS), sensor system, control system, monitoring system, or the like. Aircraft computers 22 receive in some embodiments real-time commands (pilot input) via cyclic and/or collective controller 24.

Figure 2:
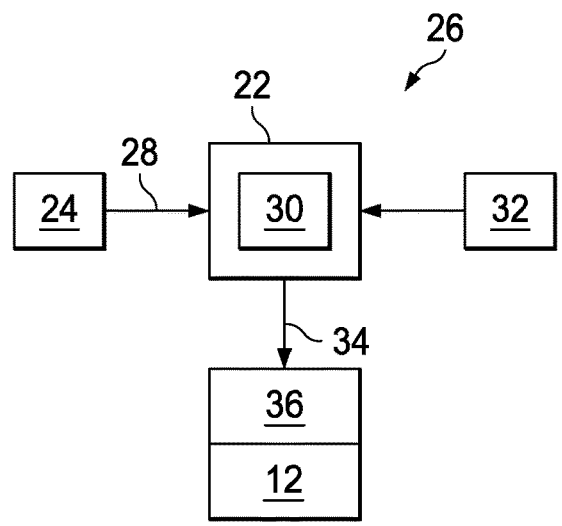
FIG. 2 is a schematic block diagram of an exemplary flight control system.

FIG. 2 illustrates an exemplary flight control system 26 to control low speed flight of aircraft 10 in response to pilot inputs via controller (stick and/or foot pedals) 24. With additional reference to FIG. 1, pilot inputs 28 via controller 24 are received by aircraft computer 22 and compared to control laws 30. The pilot input to control laws 30 is the displacement of controller 24 relative for example to a centered, no-force position, also referred to as the "detent" position. Sensors 32 provide data, such as velocity, to aircraft computer 22 for comparison to control laws 30. The control laws process the controller inputs to generate the appropriate aircraft response commands 34 to maneuver the aircraft. The control law outputs 34, for example, are routed to actuators 36 to operate rotor system 12. The flight control system implements auto-moding logic enabling seamless and transient free low speed control without the need for manual cockpit switches or the need for a pilot to use switches to transition between the TRC and LAC regions.

Figure 3:
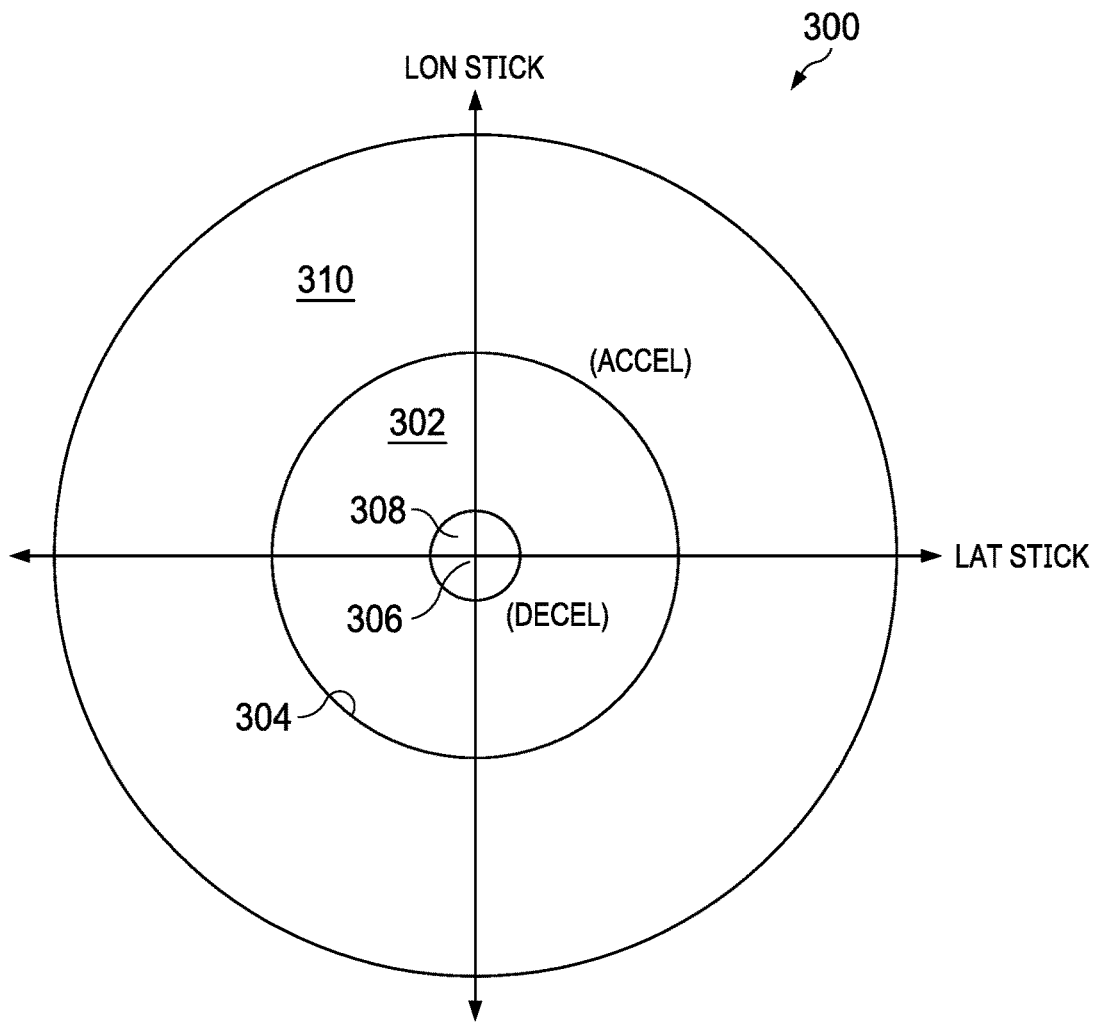
FIG. 3 illustrates exemplary translational rate command (TRC) and linear acceleration command (LAC) regions.

Referring to the drawings, FIG. 3 illustrates a flight envelope 300 with control law modes configured to enable low speed control. In this example, the vertical axis corresponds to longitudinal controller displacement and the horizontal axis corresponds to lateral controller displacement. Flight envelope 300 includes a region depicting the TRC region 302. In TRC region 302, aircraft 10 will fly at a groundspeed proportional to the amount of controller 24 displacement. In other words, controller 24 displacement demands translational rate, or speed. TRC region 302 is bounded by a control transition displacement (CTD) 304, which is located at a selected displacement from a detent position 306 illustrated also as position hold (PHLD) 308 in this example. In this example, and for the purpose of description, CTD is a controller 24 displacement of 1.0 inches. TRC region 302 may also be associated with the TRC threshold speed 314 (FIGS. 4, 5) whereby the flight control system is not in the TRC region when the aircraft is at groundspeed greater than the TRC threshold speed. In a non-limiting example, the TRC threshold speed, e.g., maximum speed, is at or about 10 knots. Automatic hover hold will engage if the pilot releases the controls, regardless of speed.

Aircraft computer 22 will transition from TRC region 302 to a LAC region 310 when controller 24 is displaced above CTD 304. The pilot does not have to use a cockpit or controller switch to change between the TRC and LAC regions. In the LAC region 310, displacing controller 24 commands an acceleration or deceleration proportional to the displacement from CTD 304. If controller 24 is relaxed in the LAC region to CTD 304, the speed will be held. Flight control will remain in the LAC region if the controller is moved below CTD 304 and the groundspeed remains greater than the TRC threshold speed. Flight control will transition to TRC region 302 when the groundspeed decelerates to a speed at or below the TRC threshold speed.

While in LAC, CTD 304 commands zero acceleration. A cue may be communicated to the pilot when controller 24 is at the CTD 304. The cue may be one or more of a tactile, visual, or audible cue. The cue may be, for example, a tactile cue such as a soft stop or vibration. The tactile cue may be communicated through the controller.

Figure 4:
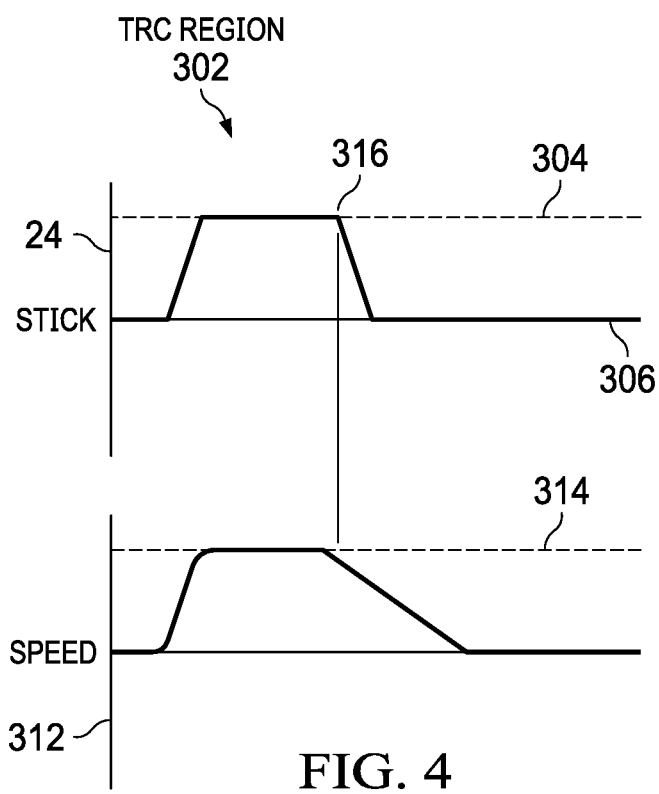
FIG. 4 graphically illustrates flight control in an exemplary translation rate command region.
Figure 5:
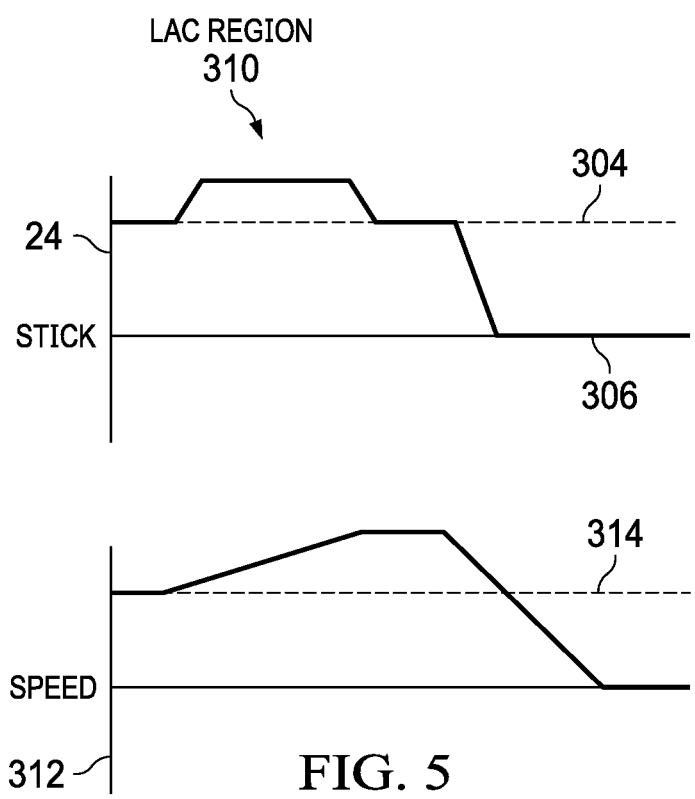
FIG. 5 graphically illustrates flight control in an exemplary linear acceleration command region.

FIGS. 4 and 5 graphically illustrate flight control in the TRC region and the LAC region, respectively. With reference to FIG. 4, flight control is in TRC region 302. Displacement of controller 24 at and between detent 306 and CTD 304 demands a speed 312. For example, and without limitation, hover is held at detent 306, 5 knots is demanded at 0.5 inch displacement, and at 1 inch displacement, equal to CTD 304, a speed of 10 knots is demanded. In the TRC region, CTD 304 demands the TRC threshold speed 314. Point 316 illustrates controller 24 being released to detent 306 and flight control decelerating to a hover.

FIG. 5 illustrates flight control in the LAC region 310. Displacement of controller 24 above CTD 304 commands acceleration proportional to the displacement above CTD 304. When controller 24 is relaxed to CTD 304 at a speed greater than the TRC threshold speed 314, the higher speed is held. Flight control remains in LAC region 310 when controller 24 is displaced below CTD 304 and the groundspeed of the aircraft is greater than TRC threshold speed 314. Flight control will transition to TRC region 302 when controller 24 is below CTD 304 and the speed equals TRC threshold speed 314. As with TRC, releasing controller 24 to detent 306 while in LAC results in flight control decelerating to a hover.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for controlling low speed flight of an aircraft having a controller receiving manual pilot input, the method comprising:
    defining a control transition displacement (CTD) relative to a centered, no-force detent position of the controller, the controller in data communication with an aircraft computer;
    defining a translational rate command (TRC) region bounded by the CTD and a TRC threshold speed;
    defining a linear acceleration command (LAC) region where the controller is displaced greater than the CTD or the aircraft exceeds the TRC threshold speed;
    maneuvering the aircraft in response to displacing the controller from the detent position in response to manual input from a pilot;
    commanding, when in the TRC region, a speed proportional to the displacement of the controller from the detent position;
    commanding, when in the LAC region, an acceleration or deceleration proportional to the displacement of the controller from the CTD; and
    transitioning, with an aircraft computer, from translational rate commands in the TRC region to linear acceleration commands in the LAC region.

2. The method of claim 1, wherein the CTD is approximately 1-inch from the detent position and the TRC threshold speed is approximately 10 knots.

3. The method of claim 1, comprising commanding acceleration when the controller is displaced greater than the CTD;
    commanding zero acceleration when the controller is at the CTD; and
    commanding deceleration when the controller is displaced less than the CTD and the groundspeed is greater than the TRC threshold speed.

4. The method of claim 1, further comprising communicating a tactile cue when the controller is at the CTD.

5. The method of claim 4, wherein the tactile cue is communicated through the controller.

6. The method of claim 1, wherein the transitioning between the TRC and the LAC occurs without the use of manually operated switches.

7. The method of claim 1, wherein the CTD is approximately 1-inch form the detent position.

8. The method of claim 7, comprising commanding acceleration when the controller is displaced greater than the CTD;
    commanding zero acceleration when the controller is at the CTD; and
    commanding deceleration when the controller is displaced less than the CTD and the groundspeed is greater than the TRC threshold speed.

9. The method of claim 1, wherein the TRC threshold speed is approximately 10 knots.

10. The method of claim 9, comprising commanding acceleration when the controller is displaced greater than the CTD;
    commanding zero acceleration when the controller is at the CTD; and
    commanding deceleration when the controller is displaced less than the CTD and the groundspeed is greater than the TRC threshold speed.

11. A system for controlling low speed flight of an aircraft, the system comprising:
    a rotor system having blades to propel the aircraft;
    a controller in data communication with an aircraft computer, the controller displaced from a detent position in response to manual input from a pilot, wherein the detent position is a centered, no-force position; and
    the aircraft computer having instructions stored thereon that cause the system to:
    transition from translational rate command (TRC) to linear acceleration command (LAC) when the controller is displaced greater than a control transition displacement (CTD) from the detent position.

12. The system of claim 11, wherein the aircraft computer causes the aircraft to maneuver with the TRC when the controller is displaced less than the CTD and a groundspeed of the aircraft is less than a TRC threshold speed and the aircraft is maneuvered with the LAC when the groundspeed is greater than the threshold speed.

13. The system of claim 12, wherein the CTD is approximately 1-inch from the detent position and the TRC threshold speed is approximately 10 knots.

14. The system of claim 12, wherein the aircraft computer causes the aircraft to:
command acceleration when the controller is displaced greater than the CTD;
command zero acceleration when the controller is at the CTD; and
command deceleration when the controller is displaced less than the CTD the groundspeed is greater than the TRC threshold speed.

15. The system of claim 11, wherein the aircraft computer causes the aircraft to transition from the LAC to the TRC when the controller is displaced less than the CTD and a groundspeed of the aircraft is less than a TRC threshold speed; and
command zero acceleration when the controller is at the CTD.

16. The system of claim 11, wherein the aircraft computer causes the aircraft to:
command, when in the TRC, a speed proportional to the displacement of the controller from the detent position;
command, when in the LAC, an acceleration or deceleration proportional to the displacement of the controller from the CTD; and
transition between the TRC and the LAC without the use of manually operated switches.

17. The system of claim 11, wherein the aircraft computer causes the aircraft to:
command, when in the TRC, a speed proportional to the displacement of the controller from the detent position; and
command, when in the LAC, an acceleration or deceleration proportional to the displacement of the controller from the CTD.

18. The system of claim 17, wherein the aircraft computer causes the aircraft to:
command acceleration when the controller is displaced greater than the CTD; and
command zero acceleration when the controller is at the CTD.

19. The system of claim 11, wherein the CTD is approximately 1-inch from the detent position.

* * * * *